US012646836B2

(12) United States Patent
Paz et al.

(10) Patent No.: US 12,646,836 B2
(45) Date of Patent: Jun. 2, 2026

(54) MOTOR-BASED LENS BEAMFORMER

(71) Applicant: QUALCOMM Incorporated, San Diego, CA (US)

(72) Inventors: Daniel Paz, Atlit (IL); Michael Levitsky, Rehovot (IL); Assaf Touboul, Netanya (IL); Yehonatan Dallal, Kfar Saba (IL); Erez Havakuk, Petah Tikva (IL); Eliyahu Arbiv, Nir Galim (IL)

(73) Assignee: QUALCOMM Incorporated, San Diego, CA (US)

( * ) Notice: Subject to any disclaimer, the term of this patent is extended or adjusted under 35 U.S.C. 154(b) by 590 days.

(21) Appl. No.: 18/167,359

(22) Filed: Feb. 10, 2023

(65) Prior Publication Data

US 2024/0275045 A1    Aug. 15, 2024

(51) Int. Cl.
    *H01Q 3/46*     (2006.01)
    *H04B 7/0408*     (2017.01)

(52) U.S. Cl.
    CPC ............. *H01Q 3/46* (2013.01); *H04B 7/0408* (2013.01)

(58) Field of Classification Search
    CPC .. H04B 7/2041; H04B 7/0408; H04B 7/0491;
               H04B 7/10; H04B 7/18513; H04B
              7/0413; H04B 10/1129; H04B 10/118;
            H04B 7/024; H01Q 25/00; H01Q 21/00;
            H01Q 3/046; H01Q 3/08; H04W 16/28
    See application file for complete search history.

(56) References Cited

U.S. PATENT DOCUMENTS

| | | | | |
|---|---|---|---|---|
| 6,396,448 | B1 * | 5/2002 | Zimmerman | ............ H01Q 3/14 |
| | | | | 343/753 |
| 6,782,277 | B1 * | 8/2004 | Chen | .................... H04B 7/0615 |
| | | | | 455/445 |
| 10,256,551 | B2 * | 4/2019 | Shehan | .................. H01Q 1/526 |
| 10,959,110 | B2 * | 3/2021 | Linehan | ................ H01Q 1/246 |
| 2007/0285327 | A1 * | 12/2007 | Paschen | .................. H01Q 3/14 |
| | | | | 343/757 |
| 2016/0380353 | A1 * | 12/2016 | Lysejko | .................. H05K 7/20 |
| | | | | 343/872 |
| 2020/0091622 | A1 * | 3/2020 | Turpin | ..................... H01Q 3/04 |
| 2020/0350681 | A1 * | 11/2020 | Scarborough | ............ H01Q 1/42 |
| 2021/0013506 | A1 * | 1/2021 | Takamori | ............... C01G 53/82 |
| 2021/0013953 | A1 * | 1/2021 | Hormis | ................ H04B 7/0897 |
| 2021/0111499 | A1 * | 4/2021 | Ho | ........................ H01Q 19/062 |
| 2021/0167512 | A1 * | 6/2021 | Lee | ........................... H01Q 3/44 |

(Continued)

FOREIGN PATENT DOCUMENTS

| | | | | | |
|---|---|---|---|---|---|
| WO | WO-2005018047 | A1 * | 2/2005 | ............... | H01Q 3/02 |
| WO | WO-2016116516 | A1 * | 7/2016 | ............... | H01Q 3/02 |

*Primary Examiner* — Sophia Vlahos
(74) *Attorney, Agent, or Firm* — QUALCOMM Incorporated

(57) ABSTRACT

Certain aspects of the present disclosure provide techniques for motor-based lens beamformer direction fine tuning. An exemplary method performed by a first apparatus includes communicating one or more transmissions with a second apparatus using a plurality of communication beams, generated by at least one lens beamformer of the first apparatus, having different spatial directions and adjusting, using at least one motor of the first apparatus coupled with the at least one lens beamformer, the different spatial directions of the plurality of communication beams generated by the at least one lens beamformer.

26 Claims, 9 Drawing Sheets

(56)                    References Cited

U.S. PATENT DOCUMENTS

| | | | |
|---|---|---|---|
| 2021/0306064 A1* | 9/2021 | Abedini | H04B 7/043 |
| 2021/0367340 A1* | 11/2021 | Horn | H01Q 19/062 |
| 2023/0179296 A1* | 6/2023 | Morris | G01S 3/38 |
| | | | 375/262 |
| 2023/0246345 A1* | 8/2023 | Turpin | H01Q 1/02 |
| | | | 343/702 |
| 2024/0040608 A1* | 2/2024 | Lee | H04W 72/23 |

* cited by examiner

800

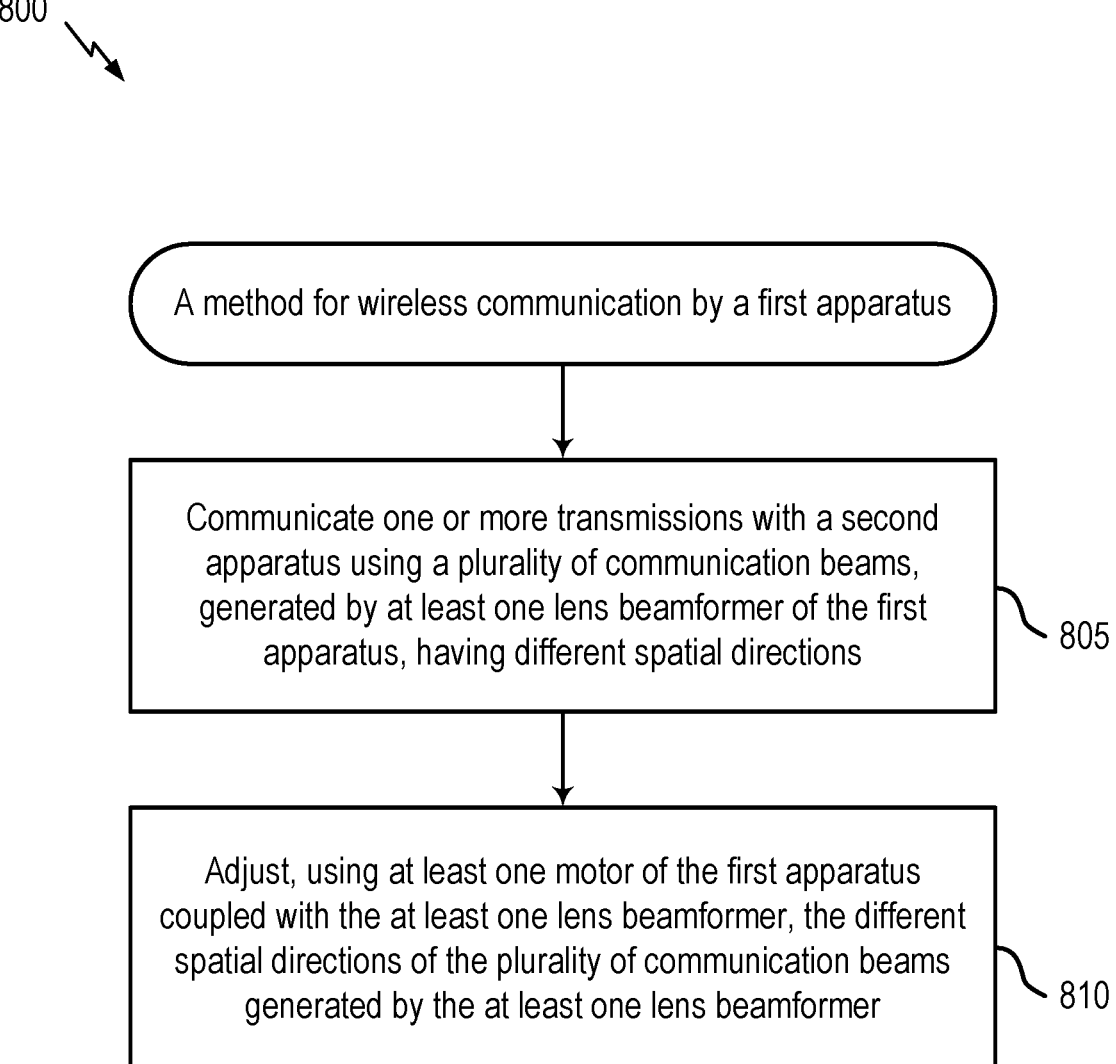

A method for wireless communication by a first apparatus

Communicate one or more transmissions with a second apparatus using a plurality of communication beams, generated by at least one lens beamformer of the first apparatus, having different spatial directions

805

Adjust, using at least one motor of the first apparatus coupled with the at least one lens beamformer, the different spatial directions of the plurality of communication beams generated by the at least one lens beamformer

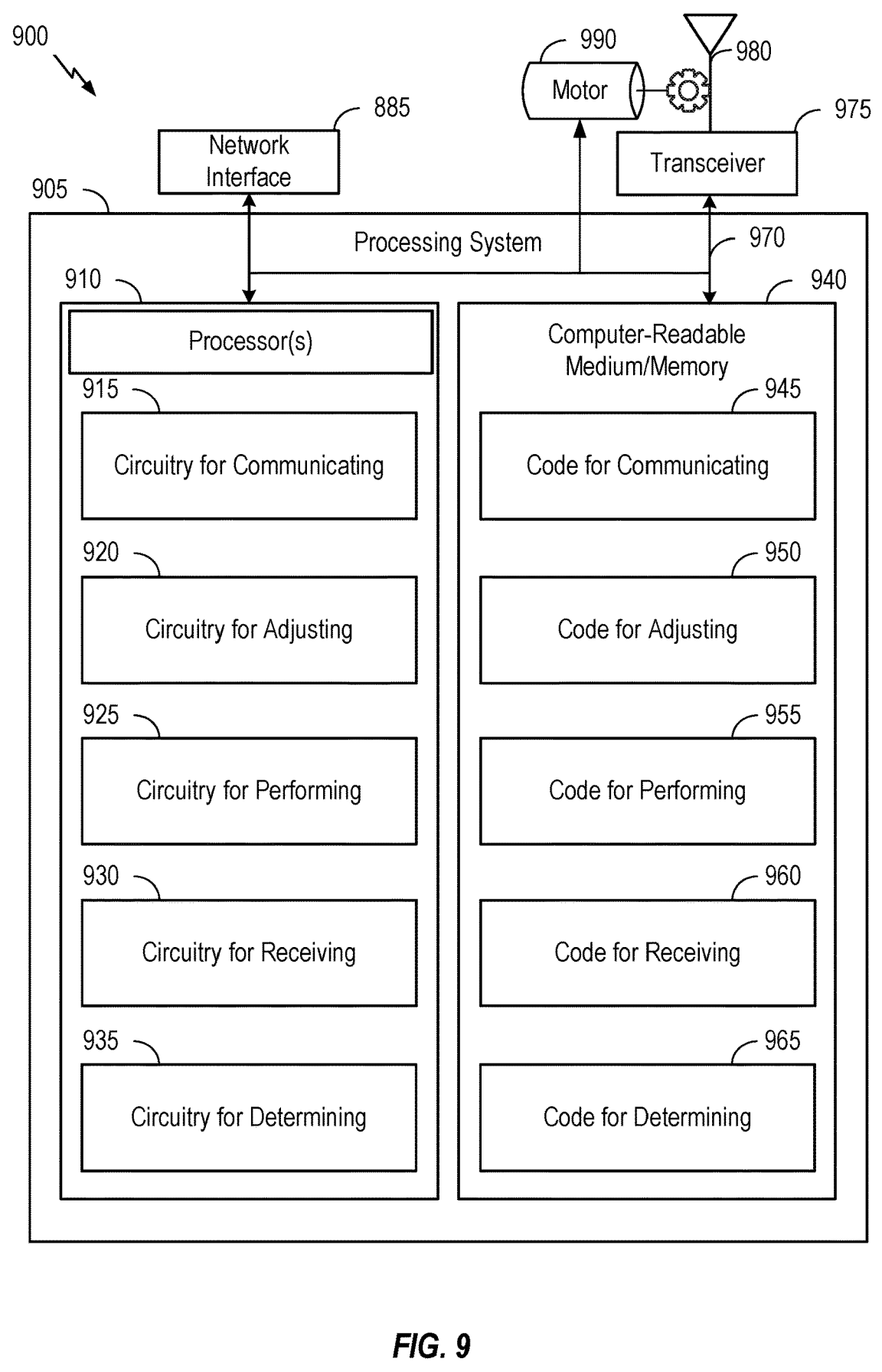

Network
Interface

990

Motor

980

975

Transceiver

905

Processing System

970

910

Processor(s)

940

Computer-Readable
Medium/Memory

915

Circuitry for Communicating

945

Code for Communicating

920

Circuitry for Adjusting

950

Code for Adjusting

925

Circuitry for Performing

955

Code for Performing

930

Circuitry for Receiving

960

Code for Receiving

935

Circuitry for Determining

965

Code for Determining

*FIG. 9*

MOTOR-BASED LENS BEAMFORMER

BACKGROUND

Field of the Disclosure

Aspects of the present disclosure relate to wireless communications, and more particularly, to techniques for motor-based lens beamformer direction fine tuning.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a first apparatus. The method includes communicating one or more transmissions with a second apparatus using a plurality of communication beams, generated by at least one lens beamformer of the first apparatus, having different spatial directions; and adjusting, using at least one motor of the first apparatus coupled with the at least one lens beamformer, the different spatial directions of the plurality of communication beams generated by the at least one lens beamformer.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 8 depicts a method for wireless communications.

FIG. 9 depicts aspects of an example communications device.

DETAILED DESCRIPTION

Figure 1:
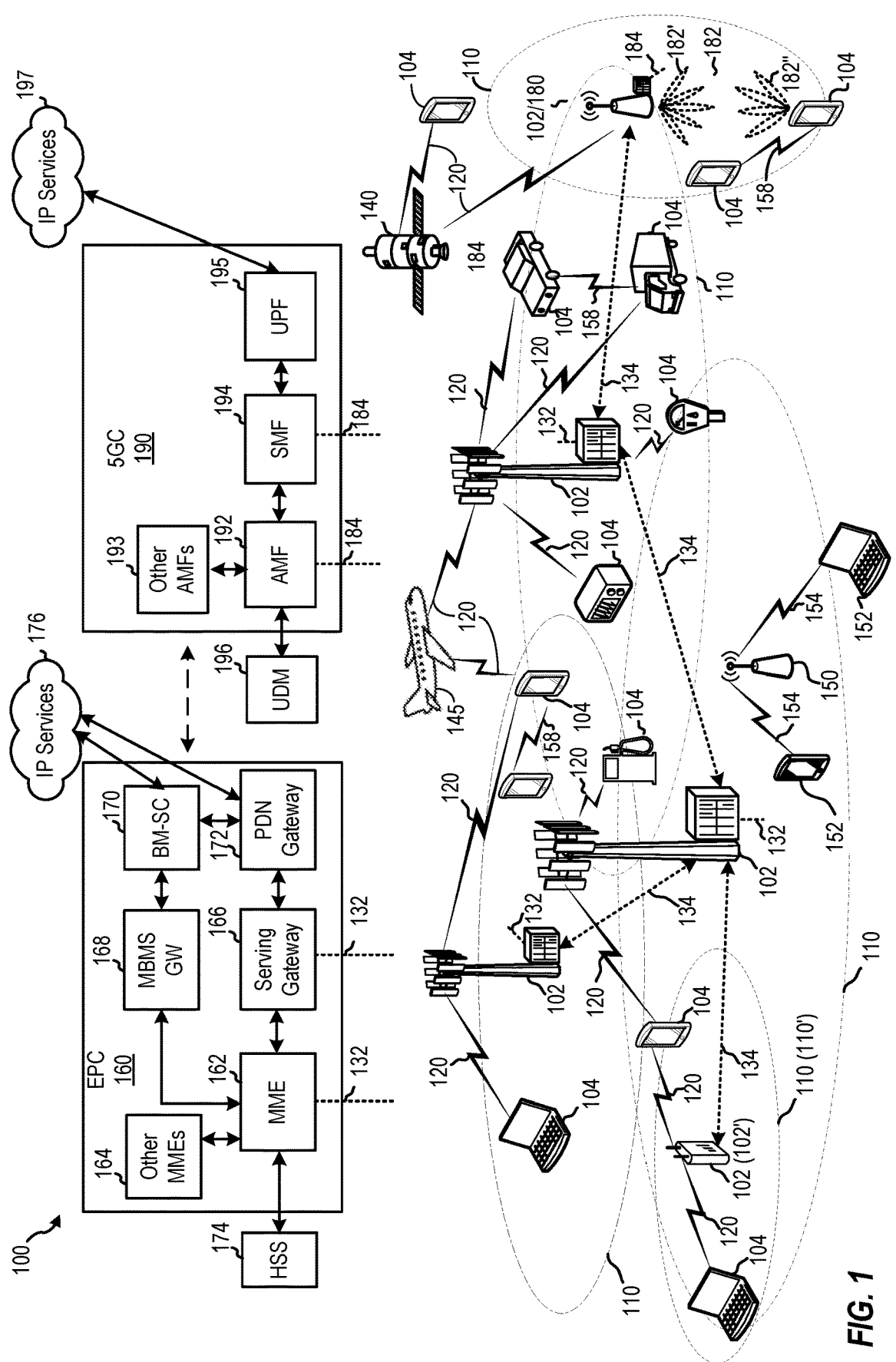
FIG. 1 depicts an example wireless communications network.

Aspects of the present disclosure provide apparatuses, methods, processing systems, and computer-readable mediums for motor-based lens beamformer direction fine tuning.

A sub-terahertz (sub-THz) band is being considered as a key area for the development of the sixth generation (6G) wireless standard due to its large available bandwidth and the ability to create narrower communication beams, resulting in better spatial separation and lower interference due to a higher beam directionality. However, communicating using these narrow communication beams in a sub-THz requires a significant amount of power, which may, at times, exceed a maximum power that a power amplifier may provide. One technique to reduce power consumption and maintain the use of the narrow communication beams for sub-THz communication is through the use of a lens beamformer or lens antenna.

A lens beamformer may be used to focus and steer electromagnetic waves into a plurality of narrow communication beams that are used to transmit and receive information. By focusing and steering the electromagnetic waves in a specific direction, a lens beamformer can reduce the amount of power needed to transmit these electromagnetic waves while at the same time improving the efficiency and range of a communication system.

When using lens beamforming, a signal may be transmitted using a lens-shaped antenna that is designed to focus the signal on a specific receiver. However, it is possible for the signal to be "mismatched" between the transmitter and the receiver if the beamforming system is not properly calibrated, causing a reduction in link budget (e.g., decrease in a maximum range of a wireless link used to transmit the signal). This can occur if the beamforming system is not properly aligned with the receiver, or if the characteristics of the transmitter and receiver do not match. In some cases, to correct this mismatch, the transmitter using a lens beamformer may be able to switch to a new communication beam generated by the lens beamformer that is better aligned with a communication beam associated with the receiver or vice versa.

However, there may be instances in which switching to a new communication beam may not be feasible or correct the mismatch, such as when the mismatch is less than an angular spacing between communication beams produced by the lens beamformer. This may be known as fractional mismatch. In this scenario, a spatial direction of an optimal communication beam for communication between the transmitter and receiver would fall somewhere between the communication beams that the lens beamformer is capable of generating. As such, because the lens beamformer would not be able to produce an optimal communication beam for communication between the transmitter and receiver, there would be a continual reduction in link budget.

Accordingly, aspects of the present disclosure provide techniques to help reduce or eliminate scenarios involving fractional mismatch between communication beams. For example, in some cases, the techniques may involve adding one or more electro-mechanical motors (or electro-pneumatic or any other type of electric motor) within a communication device that may be coupled with a lens beamformer of the communication device to mitigate any possible beam direction mismatch between the communication device and a second communication device. For example, in some cases, the motor may be used to adjust a position of the lens beamformer resulting in spatial directions of communication beams produced by the lens beamformer to also be adjusted, thereby providing the communication device with the ability to reduce any mismatch between itself and the second communication device.

By reducing mismatch between communication devices, these techniques may improve energy efficiency/power consumption within wireless communication networks using sub-THz frequency bands. Additionally, these techniques may increase a sub-THz link range, allow for more robust beam tracking with lens beamformer, reduce the cost and complexity of lens beamformer, reduce the cost and complexity of sub-THz smart repeater/infrastructure nodes, and simplify infrastructure installation procedures (e.g., technician time/installation cost).

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
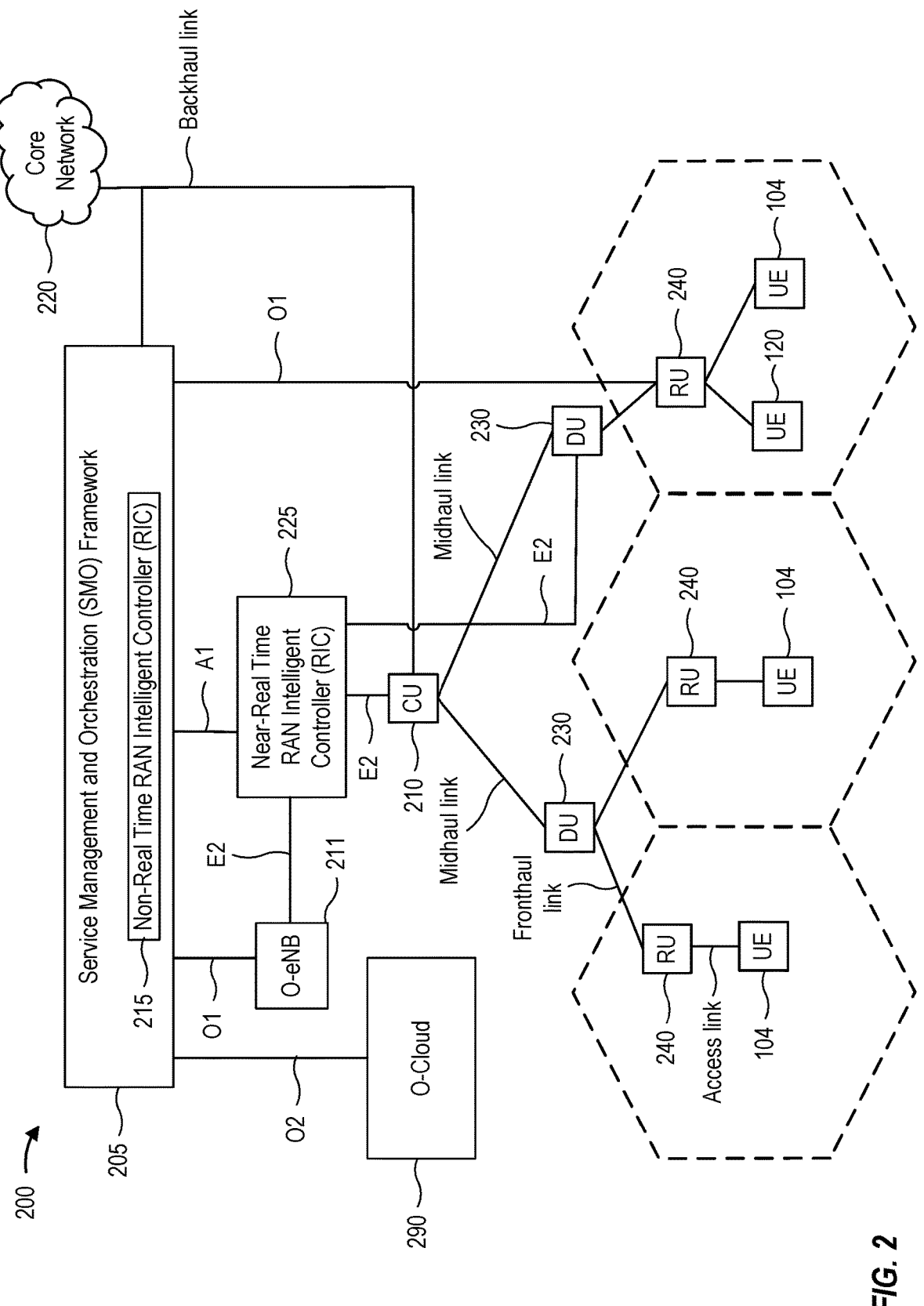
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5GNR orNext Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182'''. BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-5C) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
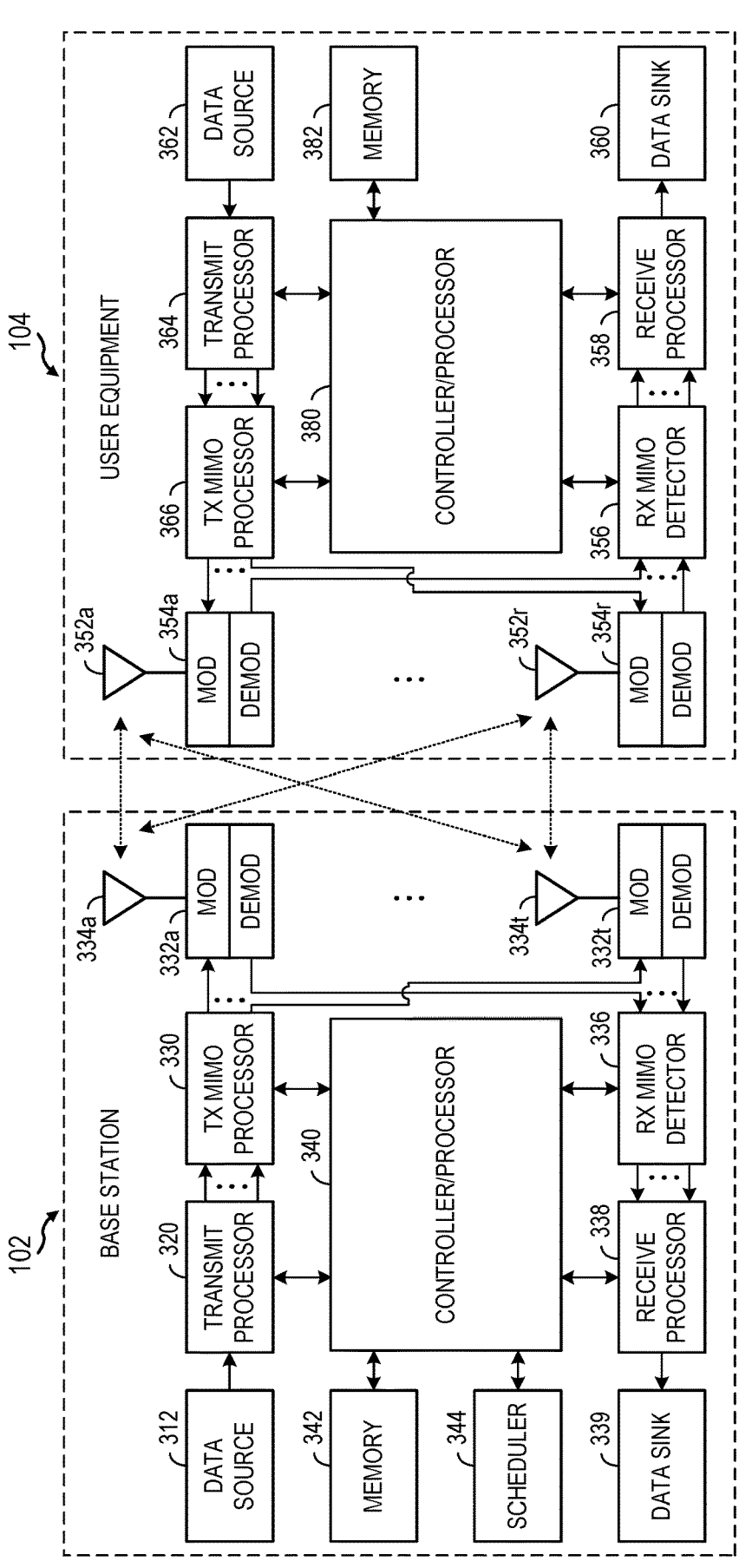
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a-332t*. Each modulator in transceivers 332*a-332t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a-332t* may be transmitted via the antennas 334*a-334t*, respectively. In some embodiments, the antennas 334*a-334t* may be examples of a lens antenna or beamformer as described herein.

In order to receive the downlink transmission, UE 104 includes antennas 352*a-352r* that may receive the downlink signals from the BS 102 and may provide received signals to the demodulators (DEMODs) in transceivers 354*a-354r*, respectively. In some embodiments, the antennas 352*a-352r* may be examples of a lens antenna or beamformer as described herein. Each demodulator in transceivers 354*a-*

354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a-354r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a-354r* (e.g., for SC-FDM), and transmitted to BS 102.

At BS 102, the uplink signals from UE 104 may be received by antennas 334*a-t*, processed by the demodulators in transceivers 332*a-332t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
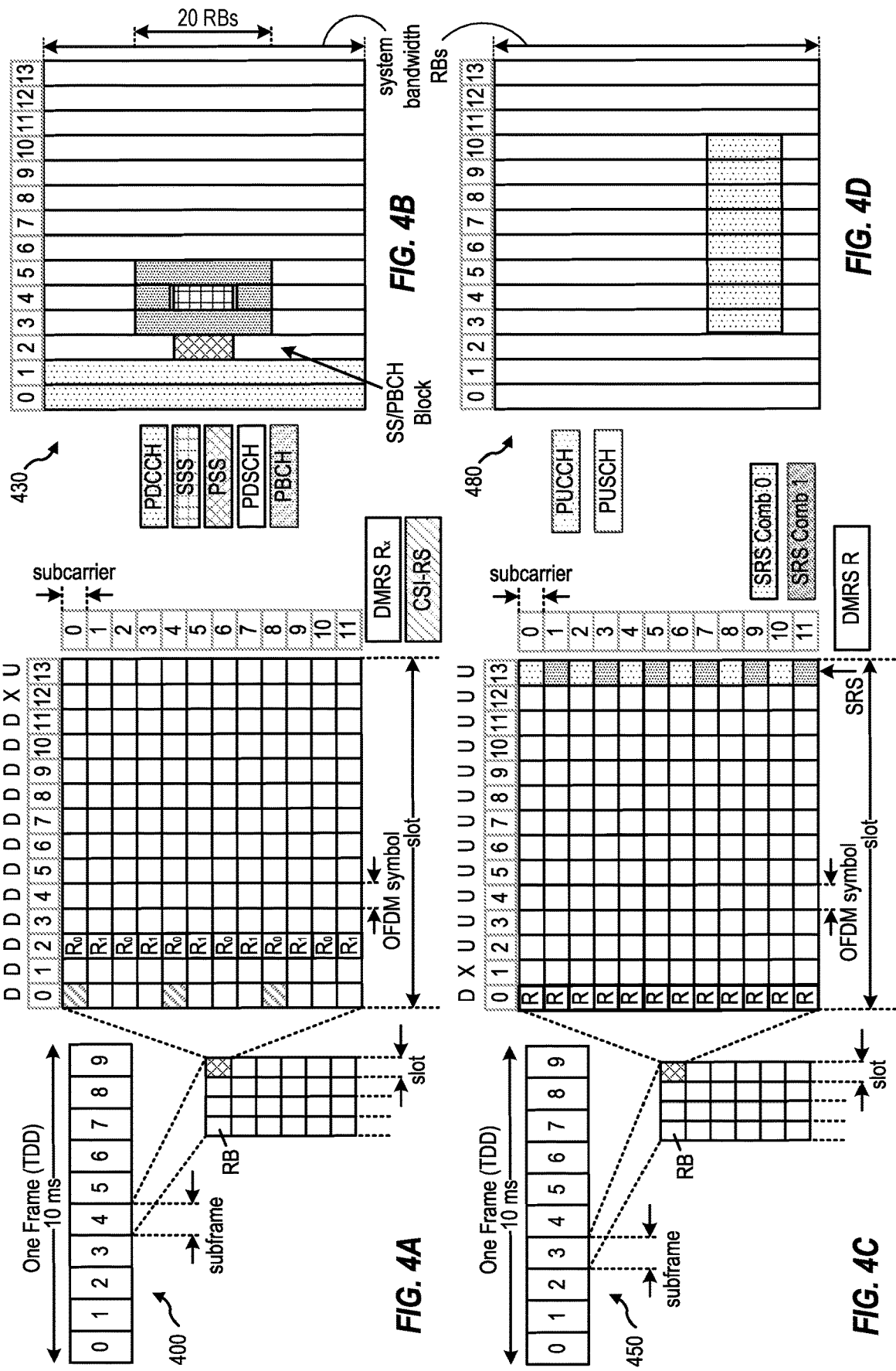
FIGS. 4A, 4B, 4C, and 4D depict various example aspects of data structures for a wireless communications network.

In particular, FIG. 4A is a diagram 400 illustrating an example of a first subframe within a 5G (e.g., 5GNNR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where is the numerology 0 to 6. As such, the numerology $\mu=0$ has a subcarrier spacing of 15 kHz and the numerology $\mu=6$ has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to Lens Beamforming

Beamforming generally refers to a mechanism that identifies the most efficient data-delivery route (path) to a particular user, and it reduces interference for nearby users in the process. Beamforming can help base stations and the UEs they serve (with possibly hundreds of individual antennas) make more efficient use of the spectrum around them. The primary challenge for massive MIMO is to reduce interference while transmitting more information from many more antennas at once. Beamforming algorithms may identify the best transmission route through the air to each user. Then they can send individual data packets in many different directions (even using reflections off objects in a precisely coordinated pattern). By choreographing the packet routes and arrival times, beamforming allows many users and multi-antenna base stations to exchange much more information at once.

In some cases, beamforming may be performed based on a lens antenna or beamformer. For example, in some cases, a lens antenna or beamformer may include a single lens configured to produce N beams concurrently to accomplish beamforming across multiple bands. In some cases, fragility of a lens antenna may make deployment more suitable for a (stationary) base station, but deployment in other devices (e.g., UEs, integrated access and backhaul (IAB) nodes, etc.) may be possible (e.g., as advanced materials may allow smaller/more robust lens antenna designs).

In some cases, a lens beamformer may perform true-time-delay shifting (TTD), which allows extremely wideband beamforming. The time-shifting is enabled by variable propagation path-lengths within the lens and/or variable refractive indexes within lens. As will be described in greater detail, meta-materials may be used in constructing a lens antenna and/or other components in a wideband/multi-band architecture to achieve desired results described herein.

The architectures proposed herein utilize a lens antenna to produce multiple beams as an alternative (or in addition) to the conventional use of multiple phased arrays. In some cases, a lens antenna may replace multiple phased antenna arrays, resulting in a significant reduction in complexity. For example, conventional phased-array antennas may be used for beam-forming spherical wave-fronts to collimated plane waves. Such phased-arrays, however, require phase-shifters and combiners/splitters for each beam, resulting in N2 phase-shifters for N beams with N antennas. Another method of beam-forming is the Butler matrix. The implementation of a Butler matrix may require N/2 log 2N directional couplers and phase-shifters to produce N beams with N antennas.

In contrast, a lens-antenna uses a single lens to produce N beams using TTD to achieve (extremely) wideband beamforming. As noted above, this may be achieved by variable propagation path-lengths and/or variable refractive indexes within the lens.

Figure 5:
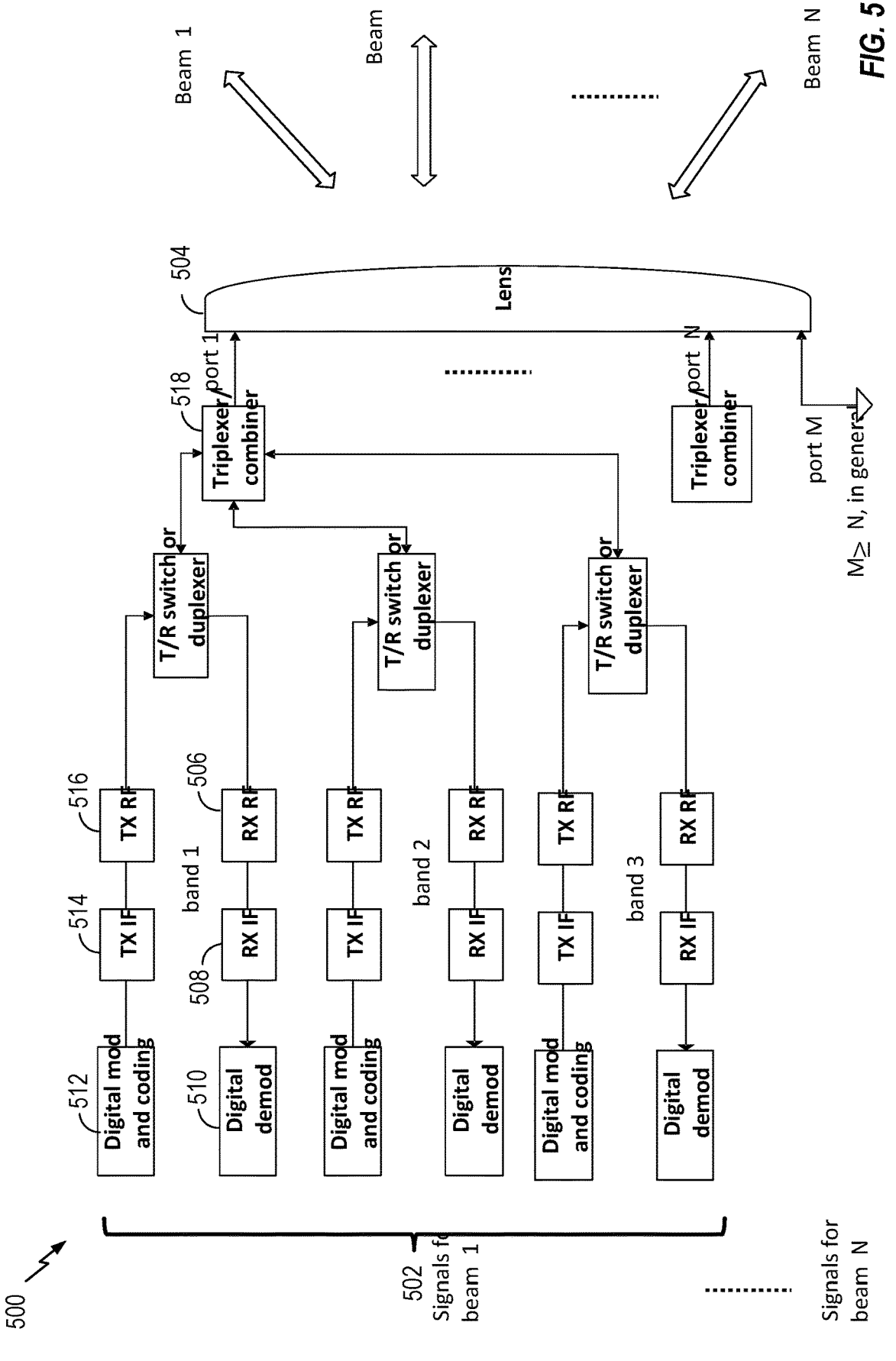
FIG. 5 illustrates an example architecture for performing lens beamforming.

FIG. 5 illustrates an example architecture 500 for performing lens beamforming. As shown, the architecture 500 includes a first set of radio frequency (RF) chains 502 configured to handle signals for one beam (e.g., for one user), such as Beam 1. While not shown in FIG. 5, the architecture 500 may also include additional sets of RF chains for handling signals for additional beams, such as Beam 2 and Beam 3. As used herein, the term RF chain generally refers to circuitry between an antenna, such as lens antenna 504, and a signal processor (e.g., a digital baseband processor).

As shown, the first set of RF chains 502 includes different pairs of receive (RX) RF chains and transmit (TX) chains, each of which may be used for processing signals for different frequency bands (e.g., band 1, band 2, band 3, etc.). For example, as shown, the first set of RF chains 502 includes a first receive (RX) RF chain 506. The first RX chain 506 may include components for processing a signal at an original incoming radio frequency before the signal is converted to a lower intermediate frequency (IF) by an RX IF converter component 508 and sent to a digital demodulator 510 for demodulation. Conversely, a transmit (TX) RF chain may include components to take a lower IF signal and generate an RF signal for transmission. For example, as shown, a signal may be coded and modulated by a digital modulator and coding component 512, sent to a TX IF converter component 514 to convert the coded and modulated signal to a lower IF signal, which may then be sent to a TX RF chain 516 for up-conversion to an RF signal for transmission.

In some cases, the various components of the first set of RF chains 502 (e.g., the digital demodulator 510, the RX IF converter component 508, the RX RF chain 506, the digital modulator and coding component 512, the TX IF converter component 514, and the TX RF chain 526) may be incorporated, at least partially, within a transceiver, such as the transceivers 332a-332t of the BS 102 illustrated in FIG. 3 and transceivers 354a-354r of the UE 104 illustrated in FIG. 3. Additionally, in some cases, the lens antenna 504 (e.g., lens beamformer) may be an example of the antennas 334a-334t of the BS 102 illustrated in FIG. 3 and antennas 352a-352r of the UE 104 illustrated in FIG. 3.

As illustrated, a combiner 518 (e.g., a triplexer in the illustrated example) may combine signal processing from multiple different bands (e.g., band 1, band 2, and band 3 in the illustrated example) and feed the combined multi-band signal into a port of the lens antenna 504 (e.g., lens beamformer). A triplexer may generally refer to a combiner that includes some filtering and corresponding frequency selectivity (e.g., while getting one band, it may reject other bands). In some cases, TX and/or RX RF chains may have their filtering, making it unnecessary to include filtering in the combiner.

As illustrated, each of the N sets of RF chains may have a similar combiner to feed a respective port of the lens antenna 504, corresponding to a beam (e.g., for a different user) transmitted in a particular spatial direction. For example, as shown, the signals associated with the first set of RF chains 502 may be combined within the combiner 518 (e.g., triplexer), sent to the lens antenna 504 for beamforming, and transmitted via beam 1. In some cases, more than one of the N beams may be for a same user.

On the RX side, a combined RF signal may be fed from a port to the corresponding RX RF chains. As illustrated, in some cases, a transmit/receive switch (or duplexer) may be used to route the Tx RF signals from each Tx RF chain (corresponding to a different band) to the lens antenna port (via the combiner) and to route the Rx RF signals from the lens antenna port (via the combiner/de-combiner) to corresponding Rx RF chain.

Aspects Related to Motor-Based Lens Beamformer Direction Fine Tuning

A sub-terahertz (sub-THz) band is being considered as a key area for the development of the sixth generation (6G) wireless standard due to its large available bandwidth and the ability to create narrower beams compared to frequencies in the FR2/FR4 range (e.g., at least approximately a factor of one-half beam width reduction), resulting in better spatial separation and lower interference due to a higher beam directionality. Sub-THz refers to a frequency spectrum that ranges between 90 GHz and 300 GHz.

Despite these advantages, sub-THz communication faces some challenges. One of the main challenges is the high absorption and scattering of sub-THz waves by water vapor and oxygen, which can result in significant signal attenuation and poor coverage. As a result, because communication may be limited based on a maximum power amplifier (PA) output power due to local regulations, finer directional beams are required to compensate for the maximum PA output characteristics at sub-THz frequencies (e.g., −10 dB less compared to millimeter wave (mmWave) frequency bands) in order to provide better range/coverage for sub-THz communication.

One technique to improve range/coverage for sub-THz communication involves the use of beamforming. Directional beams with higher beamforming gains may be achieved using a conventional array-based beamformer using a higher number of antenna elements (e.g., array dimensions). However, a having a higher number of antenna elements requires each one to be coupled with a PA/low noise amplifier (LNA) and a phase shifter, resulting in high power consumption. As a result, high power consumption associated with sub-THz communication is another primary concern.

Moreover, regardless of the high power consumption associated with increasing antenna elements to provide higher directional beams, sub-THz communication is prone to high power consumption due to the high signal bandwidth and inefficiencies associated with PAs. For example, sub-THz communication may be associated with at least a factor of two reduction in Sub-THz PA efficiency as compared to mmWave Pas. Additionally, a much higher power consumption is anticipated for Sub-THz transmission/reception in general dictated by the high signal BW (e.g., due to at least 8 times higher subcarrier spacing (SCS)) and extremely high targeted data rates.

In some cases, rather than using a conventional beamformer with an increased number of antenna elements, a lens antenna or beamformer, as described above, may be used to help reduce power consumption associated with sub-THz communication. For example, in some case, using a lens beamformer may achieve a factor of between 20 to 45 in power savings for beamforming with a same equivalent isotropically radiated power (EIRP) target as compared to conventional beamforming techniques.

In the case of a lens beamformer, each beam direction that can be generated by the lens beamformer may be associated with a specific antenna element located at a back plane of a lens of the lens beamformer. Each such antenna element may be connected to a corresponding RF chain (comprising PA/LNA, RF filters, diplexer/feeder) while one of the chains (or in some cases several chains simultaneously for multi-beam transmission) may be dynamically selected by an RF switch according to the required beam direction (TX/RX sides).

However, even though a lens beamformer allows for a very power efficient solution for beamforming, it may be challenging to achieve sufficient spatial coverage using a lens beamformer in a sub-THz band at least due to. For example, it may be challenging to achieve sufficient spatial coverage due to RF component densifications associated with the lens beamformer for sub-THz use (e.g., a high number of parallel RF chains need to be positioned close together according to a number of beams/spatial coverage that needs to be supported) and inter-beam leakage (e.g., a higher density beam grid may lead to higher inter beam leakage).

Sub-THz communication may be used in various scenarios. For example, a first use case for sub-THz involves fixed/infrastructure links used to support very high data rate transfer between two fixed locations with a LOS or near LOS (single reflection) link, such as IAB or links between sub-THz smart repeaters (e.g., including multi-hop repeating with dynamic mesh topology), wireless "fiber to the home" over sub-THz, outdoor high definition displays/cameras, and the like. Unlike in the case of direct links with nomadic sub-THz UEs (e.g., gNB-to-UE or smart repeater to UE links) which require a full angular coverage/span capability from an infrastructure node, for the sub-THz use case scenario described above with a fixed infrastructure links, only a very limited angular coverage may be required for a robust link maintenance. As such, a lens beamformer that is capable of supporting a small number of beams covering a relatively narrow angular sector may be a good solution for these use cases to improve coverage and reduce power consumption.

For the first use case described above (e.g., for fixed LOS/near LOS links), only a small set of beams/angular span may be required/need to be supported for robust link maintenance by a lens beamformer. However, the following drawbacks of lens beamformer are still relevant for this use case. For example, due to architectural constrains of the lens beamformer, the lens beamformer may only support a fixed list or number of beams (e.g., beam grid), each having a same beam width defined by the characteristics or properties of the lens of the lens beamformer. Additionally, all the available beam directions/beam grid that may be generated by a lens beamformer may be predefined or fixed according to an installation of the lens beamformer on to a corresponding infrastructure node. As a result, this installation defines a bore sight direction of the lens beamformer. Additionally, in case of a sub-THz frequency band, relatively very narrow beams may be generated even with small form factor lens antennas or beamformers (e.g., ~2°).

Due to these narrower beams and the fixed beam grid associated with the use of a lens beamformer for sub-THz communication in the first use case described above (e.g., for fixed LOS/near LOS links), a probability of mismatch between an optimal beam direction for communication between a transmitter and a receiver and a closest available beam direction supported by the fixed beam grid provided by the lens beamformer is higher in case of a sub-THz frequency band compared to lower frequency bands. This mismatch between an optimal beam direction and the closest available beam direction may result in up to a 3 dB link budget loss, which is undesirable.

Further, in some scenarios involving LOS links that are not fully due to LOS blockage events, a number of available beams on the lens beamformer covering a specific direction and a narrow angular span around this specific direction may be not sufficient to provide a fallback/alternative propagation direction option in the case of these LOS blockage events. A trivial solution to avoid this issue may be to cover a higher angular sectors by increasing a number of supported beams generated by the lens beamformer. However, increasing the number of supported beams involves a higher hardware cost associated these lens beamformers, increased design implications and complexity associated with these lens beamformers, and increases the likelihood of inter-beam leakages that may limit link performance.

Accordingly, aspects of the present disclosure provide techniques to help alleviate the drawbacks described above associated with using a lens beamformer for sub-THz communication while still taking advantage of the reduction in power consumption provided by lens beamformers. For example, the techniques presented herein involve adding one or more electro-mechanical motors (or electro-pneumatic or any other type of electric motor) within a communication device that may be coupled with each lens antenna/beamformer of the communication device to mitigate any possible beam direction mismatch and any possible angular span limitation for fixed LOS/near LOS sub-THz communication links.

For example, in some cases, to mitigate any possible beam direction mismatch between a communication device and a second communication device, an electro-mechanical motor included within the first/second communication device may be configured to adjust spatial directions of a plurality of communication beams generated by a lens beamformer of the first/second communication device. For example, in order to adjust the spatial directions of these communication beams, the electro-mechanical motor may be configured to adjust a position the lens beamformer of the first/second communication device. By allowing the spatial directions of the plurality of beams generated by a lens beamformer to be adjusted using an electro-mechanical motor, the link budget loss described above with respect to the narrow beams and fixed beam grid provided by a lens beamformer may be reduced.

Example Operations of Entities in a Communications Network

Figures 6A, 6B:
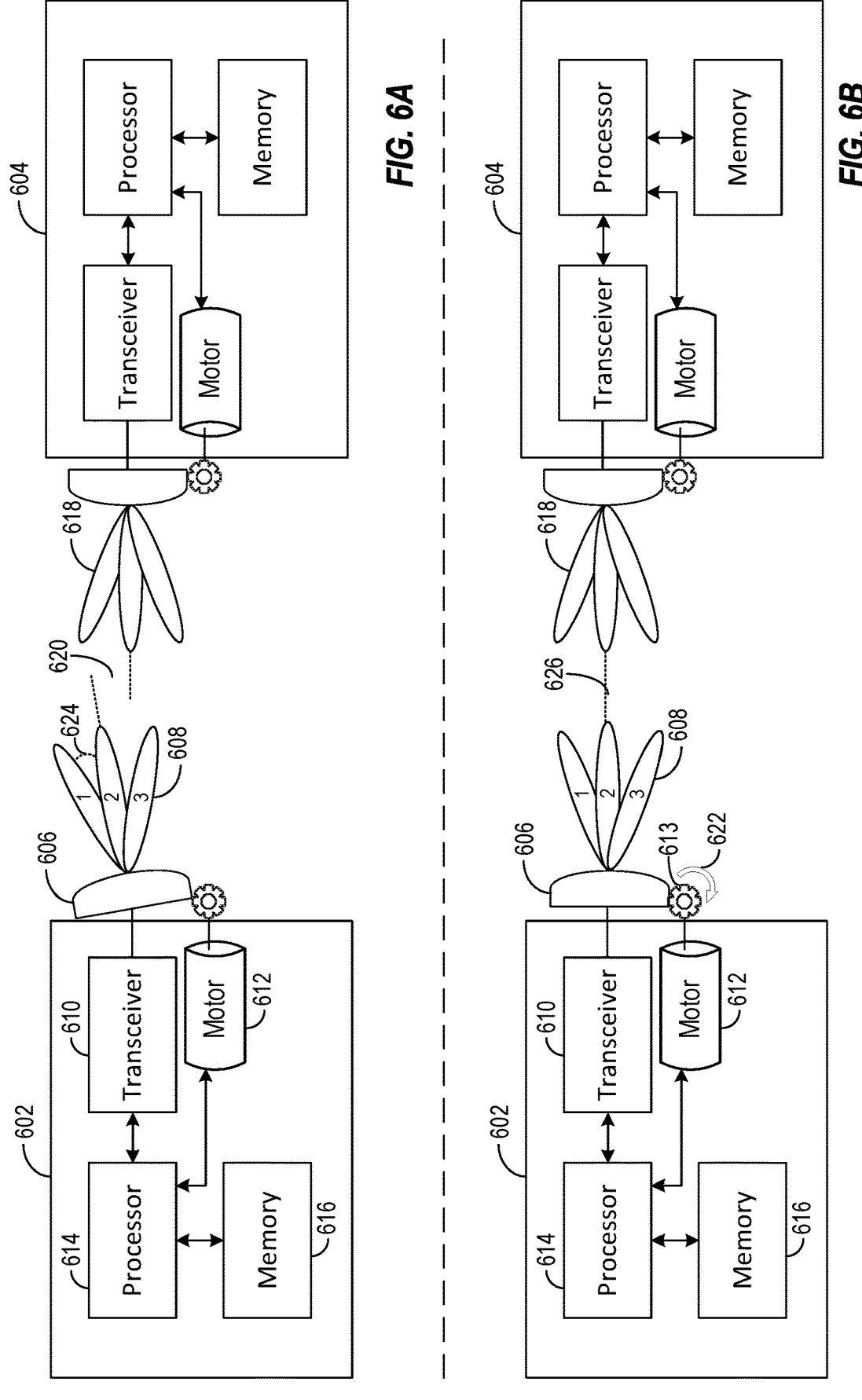
FIGS. 6A and 6B illustrate simplified block diagram of a first apparatus and a second apparatus configured to communicate in a wireless network using sub-THz frequency bands and lens beamforming.

FIGS. 6A and 6B illustrate simplified block diagrams of a first apparatus 602 and a second apparatus 604 configured to communicate in a wireless network using sub-THz frequency bands and lens beamforming. In some aspects the first apparatus 602 may be a network entity, such as the BS 102 depicted and described with respect to FIGS. 1 and 3 or a disaggregated base station depicted and described with respect to FIG. 2. In some aspects, the second apparatus 604 may be an example of a user equipment (UE), such as UE 104. In other aspects, the first apparatus 602 may be an example of the UE 104 and the second apparatus 604 may be an example of the BS 102 or a disaggregated base station depicted and described with respect to FIG. 2. In yet other aspects, the first apparatus 602 and the second apparatus 604 may be examples of integrated access and backhaul (IAB) nodes, such as a parent node, a child node, etc. While the operations 600 are primarily described from the perspective of the first apparatus 602, it should be understood that the operations 600 described with respect to the first apparatus 602 may also be performed by the second apparatus 604 and vice versa.

In some embodiments, as shown in FIG. 6A, the first apparatus 602 may include at least one lens beamformer 606 configured to generate a plurality of communication beams 608 having different spatial directions, such as communication beams 1-3. As shown, each communication beam in the plurality of communication beams 608 may be separated from a neighboring communication beam by a particular angle of separation 624 (e.g., in some cases, approximately 2 degrees). In some cases, the lens beamformer 606 may be an example of the lens antenna 504 illustrated in FIG. 5. The first apparatus 602 may also include a transceiver 610 configured to communicate (e.g., transmit and/or receive) one or more transmissions with the second apparatus 604 using the plurality of communication beams 608 generated by the at least one lens beamformer 606. In some cases, the plurality of communication beams 608 may comprise a plurality of transmit (TX) beams used for transmitting the one or more transmissions to the second apparatus 604. In other cases, the plurality of communication beams 608 may comprise a plurality of receive (RX) beams used for receiving the one or more transmissions from the second apparatus 604.

As shown, the first apparatus 602 may also include at least one motor 612 coupled with the lens beamformer 606 to enable mechanical antenna direction steering. For example, as will be described in greater detail below, the motor 612 may be configured to adjust the different spatial directions of the plurality of communication beams 608 generated by the lens beamformer 606 by manually adjusting a position of the lens beamformer 606. In some cases, the motor 612 may include an electro-mechanical motor, an electro-pneumatic motor, or the like.

Additionally, as shown, the first apparatus 602 includes a memory 616 comprising executable instructions. In some cases, the memory 616 may be an example of the memory 342 and/or the memory 382 illustrated in FIG. 3. Further, as shown, the first apparatus 602 includes a processor 614 configured to execute the executable instructions and control operation of the first apparatus 602. For example, in some cases, the processor 614 may execute the executable instructions to control operation of the transceiver 610, the lens beamformer 606, the motor 612, and/or the memory 616. In some cases, the processor 614 may be an example of the controller/processor 340 and/or the controller/processor 380 illustrated in FIG. 3.

As noted above, the first apparatus 602 may be configured to communicate with the second apparatus 604 using the plurality of communication beams 608 generated by the lens beamformer 606. Similarly, the second apparatus 604 may also communicate with the first apparatus 602 using a second plurality of communication beams 618. In some cases, however, due to inaccuracies in the positioning of the lens beamformer 606, there may be a mismatch between the spatial directions of the plurality of communication beams 608 associated with the first apparatus 602 and spatial directions of the second plurality of communication beams 618 associated with the second apparatus 604. For example, as shown at 620 in FIG. 6A, a spatial direction in which transmissions are transmitted using a center beam of the second plurality of communication beams 618 may not be aligned with a spatial direction of a center beam of the plurality of communication beams 608. As noted above, this mismatch between the plurality of communication beams 608 and the second plurality of communication beams 618 may result in losses to a link budget between the first apparatus 602 and the second apparatus 604.

Accordingly, as illustrated in FIG. 6B, to reduce this mismatch, the motor 612 may be used to adjust the different spatial directions of the plurality of communication beams 608 generated by the lens beamformer 606. The motor 612 may adjust at 622 the different spatial directions of the plurality of communication beams 608 by mechanically fine-tuning or adjusting a position of the lens beamformer 606 to reduce or eliminate the mismatch between the plurality of communication beams 608 and the second plurality of communication beams 618, as shown at 626 in FIG. 6B. Accordingly, the motor 612 may be used for spatial direction fine-tuning in case where an optimal beam is not aligned with an existing beam grid produced by the lens beamformer 606. Additionally, the motor 612 may be used to extend a relevant range of angular coverage of the lens beamformer 606 such that a lower number of beams will need to be supported by the first apparatus 602.

The motor 612 may be able to adjust the position of the lens beamformer 606 in different ways, such as turning a gear coupled with the lens beamformer 606. Using the motor

612 to turn a gear 613 to adjust the position of the lens beamformer 606 is just one method that may be used to adjust the position and other methods of adjusting may also be used by the motor 612.

In some cases, this mechanical direction fine-tuning may be used from time to time as a low-speed online beam adaptation for increased beam management robustness when the lens beamformer 606 is used and even for fixed LOS communication links. In some cases, this mechanical direction fine-tuning may also be very useful during an installation phase of the first apparatus 602 and can be fully automated.

In some cases, to ensure that the motor 612 is able to effectively reduce any mismatch associated with the spatial directions of the plurality of communication beams 608, the motor 612 may be configured to adjust the position of the at least one lens beamformer 606 according to a granularity that is at least an order of magnitude less than an angular separation (e.g., the angle of separation 624) between two adjacent communication beams in the plurality of communication beams 608, such as communication beam 1 and communication beam 2. In other words, a steering step that the motor may need to be capable of for steering or adjusting the spatial directions of the plurality of communication beams 608 may need to be at least an order of magnitude less than an angular separation between two adjacent communication beams in the plurality of communication beams 608.

In some embodiments, the motor 612 may also be configured to adjust a polarization of the plurality of communication beams 608 generated by the lens beamformer 606. For example, in some cases, in order to adjust the polarization of the plurality of communication beams generated by the at least one lens beamformer, the motor 612 may be configured to rotate the lens beamformer 606, thereby adjusting phases of the plurality of communication beams 608. In some cases, this may allow the first apparatus 602 to mitigate polarization mismatches between the first apparatus 602 and the second apparatus 604 during an installation process or period.

In some embodiments, in order to properly adjust the position of the lens beamformer 606 to reduce any mismatch associated with the plurality of communication beams 608, the processor 614 of the first apparatus 602 may determine a corrected spatial direction for at least one communication beam of the plurality of communication beams 608, such as communication beam 2 illustrated in FIGS. 6A and 6B. In some cases, the processor 614 may be configured to perform a beam refinement procedure to determine the corrected spatial direction for the at least one communication beam of the plurality of communication beams 608. After the corrected spatial direction has been determined using techniques described below, the transceiver 610 of the first apparatus 602 may communicate (e.g., receive or transmit) the one or more transmissions with the second apparatus based on the corrected spatial direction for the at least one communication beam.

In some cases, the processor 614 may be configured to perform the beam refinement procedure based on the one or more transmissions communicated with the second apparatus. In some cases, the one or more transmissions communicated with the second apparatus that may be used to perform the beam refinement procedure may include at least one of synchronization signal blocks (SSBs) or beam management channel state information reference signals (BM CSI-RSs). In some cases, In some cases, the beam refinement procedure performed by the processor 614 of the first apparatus 602 may depend on whether the first apparatus 602 is on a receiving end of the one or more transmissions or on a transmitting end of the one or more transmissions. When on the receiving end, the plurality of communication beams 608 may include a plurality of receive communication beams used by the first apparatus 602 to receive the one or more transmissions from the second apparatus 604. When on the transmitting end, the plurality of communication beams 608 may include a plurality of transmit communication beams used by the first apparatus 602 to transmit the one or more transmissions to the second apparatus 604. In either case, the beam refinement procedure (e.g., whether used to determine a corrected spatial direction for a receive communication beam or a transmit communication beam) may be performed online in a number of rounds from time to time with low periodicity.

For example, when the first apparatus 602 is on the receiving end of the one or more transmissions (e.g., the plurality of communication beams 608 include a plurality of receive communication beams used to receive the one or more transmissions), the beam refinement procedure and directional fine-tuning or adjustment of the lens beamformer 606 may be based on local receive beam measurements. In such cases, the beam refinement procedure may be performed by using a gradient search with a target to get an equal receive power (e.g., received signal strength indicator (RSSI)) on two neighboring beams adjacent (e.g., communication beams 1 and 3) to the at least one communication beam (e.g., communication beam 2). For example, with reference to FIGS. 6A and 6B, if communication beam 1 and communication beam 3 have an equal receive power but are lower than communication beam 2, then a spatial direction of communication beam 2 may be in an optimal direction relative to the second plurality of communication beams 618 associated with the second apparatus 604. Otherwise, the spatial direction of communication beam 2 may be adjusted/fine-tuned during the beam refinement procedure.

For example, when performing the beam refinement procedure, the processor 614 may cause the motor 612 to adjust a position of the lens beamformer 606 resulting in adjusted spatial directions for the plurality of communication beams 608. In some cases, after the motor 612 adjusts the position of the lens beamformer 606, the processor 614 may perform receive power measurements for the one or more transmissions received from the second apparatus 604 using the plurality of communication beams 608 having the adjusted spatial directions.

In some cases, when performing the receive power measurements, the processor 614 may measure a first receive power associated with the at least one communication beam (e.g., communication beam 2). The processor 614 may also measure receive powers associated with two additional communication beams of the plurality of communication beams that are adjacent to the at least one communication beam, such as communication beams 1 and 3. In some cases, performing the beam refinement procedure may be based on a set of measurement opportunities for performing received power measurements associated with the one or more transmissions. These measurement opportunities may include different occasions of serving SSBs in a connected mode or based on a special allocation of BM CSI-RS with repetition for receive beam testing.

In some cases, the processor 614 may repeatedly cause the motor 612 to adjust the position of the lens beamformer 606 and perform the receive power measurements until the corrected spatial direction (e.g., an optimal spatial direction) for the at least one communication beam (e.g., communication beam 2) is determined. For example, in some cases, the corrected spatial direction for the at least one communication beam comprises an adjusted spatial direction of the at least one communication beam that results in (1) the receive powers associated with the two additional communication beams that are adjacent to the at least one communication beam (e.g., communication beams 1 and 3) being approximately equal and (2) the receive powers associated with the two additional communication beams that are adjacent to the at least one communication beam being less than the first receive power associated with the at least one communication beam.

In some embodiments, when the first apparatus 602 is on the transmitting end of the one or more transmissions (e.g., the plurality of communication beams 608 include a plurality of transmit communication beams used to transmit the one or more transmissions), the beam refinement procedure and directional fine-tuning or adjustment of the lens beamformer 606 may be based on beam management reports received from the receiving end (e.g., from the second apparatus 604). In such cases, performing the beam refinement procedure may include the processor 614 of the first apparatus 602 outputting a request for transmission to the second apparatus 604 via the transceiver 610, requesting the second apparatus 604 to perform receive power measurements. For example, as noted above, during the beam refinement procedure, the processor 614 may repeatedly cause the motor 612 to adjust a position of the lens beamformer 606, resulting in the adjusted spatial directions for the plurality of communication beams 608. Accordingly, the request transmitted by the first apparatus 602 to the second apparatus 604 may request that the second apparatus perform receive power measurements for the one or more transmissions transmitted to the second apparatus 604 using the plurality of communication beams 608 having the adjusted spatial directions.

Thereafter, based on the request transmitted to the second apparatus 604, the transceiver 610 of the first apparatus may receive a measurement report from the second apparatus 604 including the receive power measurements for the one or more transmissions transmitted to the second apparatus 604 using the plurality of communication beams 608 having the adjusted spatial directions. The processor 614 of the first apparatus may then determine the corrected spatial direction for at least one communication beam (e.g., communication beam 2) based on the measurement report received from the second apparatus 604.

When the first apparatus 602 is on the transmitting end of the one or more transmissions, the beam refinement procedure may involve using a simplified gradient search, similar to that described above when the first apparatus 602 is on the receiving end. For example, the request transmitted by the first apparatus 602 to the second apparatus 604 may request a beam management report including receive power measurements for communication beams 1, 2, and 3. In some cases, communication beam 2 may comprise a serving beam. Accordingly, the measurement report received from the second apparatus 604 may include (1) a first receive power associated with communication beam 2 and (2) receive powers associated with communication beams 1 and 3 that are adjacent to communication beam 2.

Like the receiving end, when the first apparatus is on the transmitting end performing the beam refinement procedure may require corresponding TX beam measurement opportunities to allow the second apparatus to perform the receive power measurements for the plurality of communication beams 608. For example, these measurement opportunities may include measurement opportunities to measure receive power for communication beams 1-3 used by the first apparatus 602 to transmit the one or more transmissions to the second apparatus 604. These measurement opportunities may be used for measuring SSBs or beam management CSI-RSs transmitted using beam sweeping including communication beams 1-3.

As noted above, the processor 614 of the first apparatus may then determine the corrected spatial direction for at least one communication beam (e.g., communication beam 2) based on the measurement report received from the second apparatus 604. For example, the corrected spatial direction for the at least one communication beam comprises an adjusted spatial direction of the at least one communication beam that results in: (1) the receive powers associated with the two additional communication beams that are adjacent to the at least one communication beam being approximately equal and (2) the receive powers associated with the two additional communication beams that are adjacent to the at least one communication beam being less than the first receive power associated with the at least one communication beam.

While the techniques described above primarily relate to fixed LOS applications, these techniques may also be used to support dynamic mesh topologies. For example, in context a dynamic mesh topology, some multi-hop link nodes (e.g., smart repeaters) may dynamically establish/activate/deactivate sub-THz LOS links with different parent or child JAB nodes for different multi-hop link activations in different scenarios.

Figures 7A, 7B, 7C:
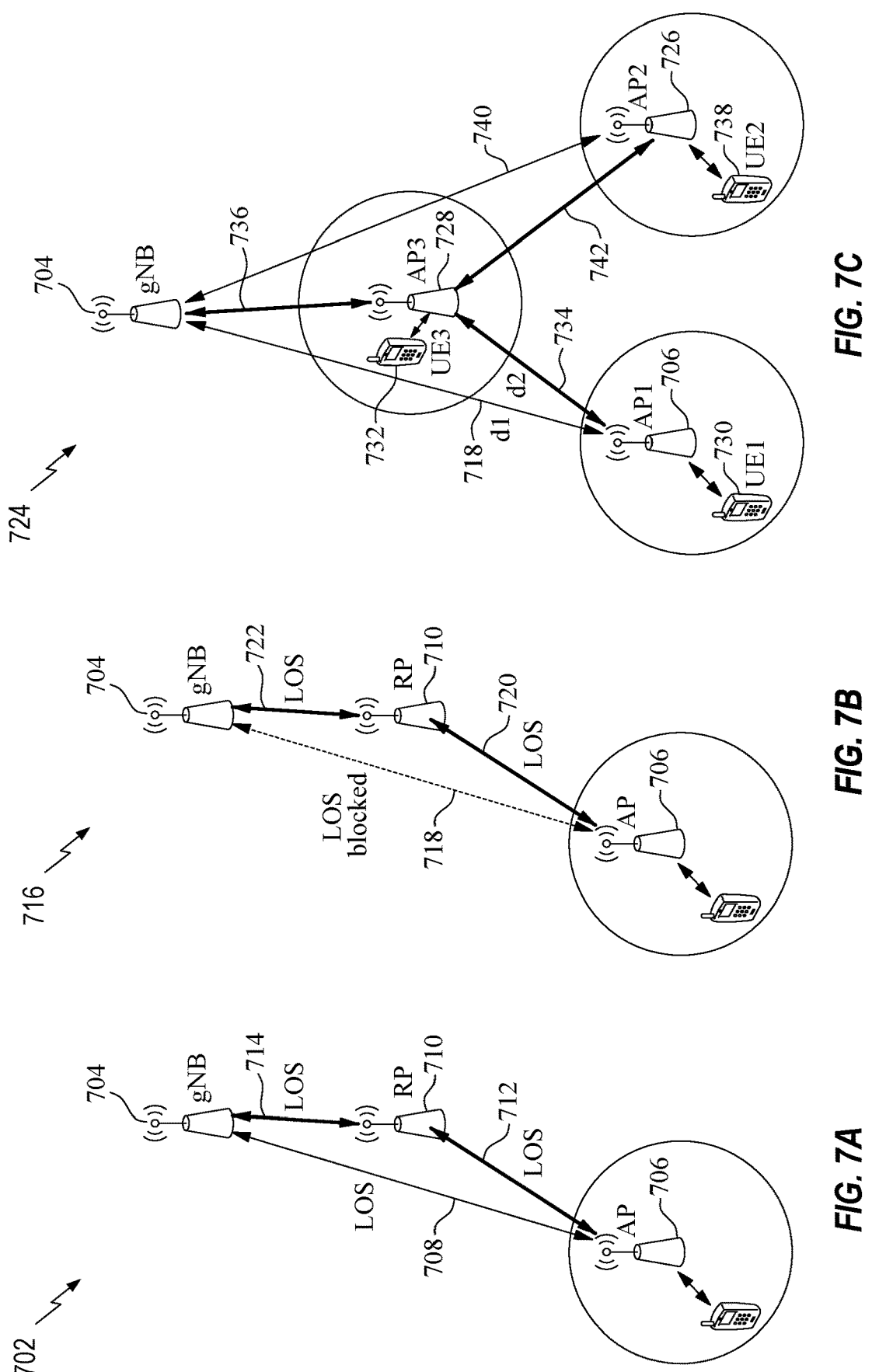
FIGS. 7A, 7B, and 7C illustrate different dynamic mesh topologies.

FIGS. 7A, 7B, and 7C illustrate different dynamic mesh topologies. For example, FIG. 7A illustrates a first dynamic mesh topology 702 having two sub-THz link activations between a gNB 704 and an access point (AP) 706, which may change depending on humidity conditions. For example, high humidity conditions (e.g., heavy rain, snow, fog, etc.) may result in up to approximately 20 dB of attenuation of wirelessly transmitted signals. As a result, depending on the humidity conditions, the gNB 704 and AP 706 may communicate using a first LOS link 708 when humidity conditions are low (e.g., below a threshold). In other cases, when humidity conditions are high (e.g., greater than or equal to a threshold), the gNB 704 and AP 706 may communicate via a smart repeater (RP) 710 using two different LOS links, such as a second LOS link 712 and a third LOS link 714.

FIG. 7B illustrates a second dynamic mesh topology 716 having two sub-THz link activations between the gNB 704 and the AP 706, which may change depending on whether a LOS link activation becomes blocked. For example, the gNB 704 and AP 706 may normally communicate using a first LOS link 718. However, in some cases, the first LOS link 718 may become blocked for various reasons. In some cases, when the first LOS link 718 becomes blocked, the gNB 704 and AP 706 may then communicate via the RP 710 using two different LOS links, such as a second LOS link 720 and a third LOS link 722.

FIG. 7C illustrates a third dynamic mesh topology 724 having multiple sub-THz link activations between the gNB 704, the AP 706, an AP 726, and an AP 728, which may change based on whether UEs respectively associated with the AP 706, the AP 726, and the AP 728 are concurrently scheduled or not. For example, when a first UE 730 associated with the AP 706 is not concurrently scheduled with a third UE 732 associated with the AP 728, the gNB 704 and the AP 706 may communicate using a LOS link 734. However, when the first UE 730 associated with the AP 706 is concurrently scheduled with the third UE 732 associated with the AP 728, the gNB 704 and the AP 706 may communicate via the AP 728 using two LOS links, such as the LOS link 734 and LOS link 736.

Similarly, when a second UE 738 associated with the AP 726 is not concurrently scheduled with the third UE 732 associated with the AP 728, the gNB 704 and the AP 726 may communicate using a LOS link 740. However, when the second UE 738 associated with the AP 726 is concurrently scheduled with the third UE 732 associated with the AP 728, the gNB 704 and the AP 726 may communicate via the AP 728 using two LOS links, such as the LOS link 742 and LOS link 736.

As can be seen in the different dynamic mesh topologies shown in FIGS. 7A, 7B, and 7C, some multi hop link nodes, such as the RP 710 (e.g., smart repeaters), may dynamically establish/activate/deactivate sub-THz LOS links with different parent (e.g., gNB 704) or child nodes (e.g., AP 706, AP 726, AP 728, etc.) for different multi hop link activations in different scenarios.

In some cases, because dynamic mesh topologies may change overtime, every time that a different parent/child node (e.g., smart repeater/mesh node) is targeted by a network (e.g., wireless communication network 100) for link establishment/activation, a different angular direction for a LOS link may be required. Rather than equipping a smart repeater with several antenna panels/lens beamformers according to a number of different LOS links/directions supported that that smart repeater (e.g., given that each lens beamformer supports only a narrow angular span), a single lens beamformer supporting a small number of communication beams may instead be used and a complementary electro-mechanical/pneumatic motor used for LOS direction adjustment, as described above.

In some cases, a lens beamformer bore side may be adjusted using an electro-mechanical/pneumatic motor according LOS link direction a known to the network (e.g., one of infrastructure link alternatives) if needed before every link establishment/activation procedure. In some cases, the indication of the LOS link direction may indicate an angular change relative to a previous link activation and may be indicated by the network to the corresponding sub-THz smart repeater/mesh node.

Accordingly, for example, with reference to FIG. 6, in some cases, the first apparatus 602 may receive, from the second apparatus 604 (e.g., a network node), an indication of a LOS link direction of the second apparatus 604 relative to the first apparatus 602 (e.g., via transceiver 610). In such cases, the processor 614 of the first apparatus 602 may then cause the motor 612 to adjust the different spatial directions of the plurality of communication beams 608 generated by the at least one lens beamformer 606 based on the indication of the LOS link direction of the second apparatus 604.

In some cases, during a corresponding sub-THz link/hop active/usage time in a dynamic mesh topology, any required beam switch for a robust link maintenance may be done digitally with a low switching latency, relying on lens beamformer capabilities (e.g., capability to support of some minimum number of beams/minimum angular span).

The techniques for motor-based lens beamformer direction fine tuning may help to reduce or eliminate the drawbacks described above related to lens beamformer/antenna usage (very power efficient BF solution) for various use cases of sub-THz communication. Additionally, these techniques may improve energy efficiency/power consumption (complementary component for low power BF solution for infrastructure links) within a wireless communication network (e.g., wireless communication network 100) using sub-THz frequency bands. Additionally, these techniques may increase a sub-THz link range, allow for more robust beam tracking with lens beamformer, reduce the cost and complexity of lens beamformer, reduce the cost and complexity of sub-THz smart repeater/infrastructure nodes, and simplify infrastructure installation procedures (e.g., technician time/installation cost).

Example Operations

FIG. 8 shows an example of a method 800, performed by a first apparatus, for wireless communication with a second apparatus. In some examples, the first apparatus (and/or the second apparatus) is a user equipment, such as a UE 104 of FIGS. 1 and 3. In some examples, the first apparatus (and/or the second apparatus) is a network entity, such as a BS 102 of FIGS. 1 and 3, or a disaggregated base station as discussed with respect to FIG. 2.

Method 800 begins at step 805 with communicating one or more transmissions with a second apparatus using a plurality of communication beams, generated by at least one lens beamformer of the first apparatus, having different spatial directions. In some cases, the operations of this step refer to, or may be performed by, circuitry for communicating and/or code for communicating as described with reference to FIG. 9.

Method 800 then proceeds to step 810 with adjusting, using at least one motor of the first apparatus coupled with the at least one lens beamformer, the different spatial directions of the plurality of communication beams generated by the at least one lens beamformer. In some cases, the operations of this step refer to, or may be performed by, circuitry for adjusting and/or code for adjusting as described with reference to FIG. 9.

In some aspects, adjusting the different spatial directions of the plurality of communication beams generated by the at least one lens beamformer comprises adjusting a position of the at least one lens beamformer.

In some aspects, adjusting the position of the at least one lens beamformer is performed according to a granularity that is at least an order of magnitude less than an angular separation between two adjacent communication beams in the plurality of communication beams.

In some aspects, the method 800 further includes adjusting, using the at least one motor, a polarization of the plurality of communication beams generated by the at least one lens beamformer. In some cases, the operations of this step refer to, or may be performed by, circuitry for adjusting and/or code for adjusting as described with reference to FIG. 9.

In some aspects, adjusting the polarization of the plurality of communication beams generated by the at least one lens beamformer comprises rotating the at least one lens beamformer.

In some aspects, the method 800 further includes performing a beam refinement procedure to determine a corrected spatial direction for at least one communication beam of the plurality of communication beams, wherein communicating the one or more transmissions with the second apparatus is based on the corrected spatial direction for the at least one communication beam. In some cases, the operations of this step refer to, or may be performed by, circuitry for performing and/or code for performing as described with reference to FIG. 9.

In some aspects, performing the beam refinement procedure is based on a set of measurement opportunities for performing received power measurements associated with the one or more transmissions.

In some aspects, performing the beam refinement procedure is based on the one or more transmissions communicated with the second apparatus; and the one or more transmissions communicated with the second apparatus comprise at least one of SSBs or BM CSI-RSs.

In some aspects, performing the beam refinement procedure comprises adjusting a position of the at least one lens beamformer resulting in adjusted spatial directions for the plurality of communication beams.

In some aspects, performing the beam refinement procedure comprises performing receive power measurements for the one or more transmissions received from the second apparatus using the plurality of communication beams having the adjusted spatial directions.

In some aspects, performing the receive power measurements comprises: measuring a first receive power associated with the at least one communication beam; and measuring receive powers associated with two additional communication beams of the plurality of communication beams that are adjacent to the at least one communication beam.

In some aspects, the corrected spatial direction for the at least one communication beam comprises an adjusted spatial direction of the at least one communication beam that results in: the receive powers associated with the two additional communication beams that are adjacent to the at least one communication beam being approximately equal; and the receive powers associated with the two additional communication beams that are adjacent to the at least one communication beam being less than the first receive power associated with the at least one communication beam.

In some aspects, performing the beam refinement procedure comprises transmitting a request to the second apparatus, requesting the second apparatus to perform receive power measurements for the one or more transmissions transmitted to the second apparatus using the plurality of communication beams having the adjusted spatial directions.

In some aspects, the method 800 further includes receiving a measurement report from the second apparatus including the receive power measurements for the one or more transmissions transmitted to the second apparatus using the plurality of communication beams having the adjusted spatial directions. In some cases, the operations of this step refer to, or may be performed by, circuitry for receiving and/or code for receiving as described with reference to FIG. 9.

In some aspects, the method 800 further includes determining the corrected spatial direction for at least one communication beam based on the measurement report received from the second apparatus. In some cases, the operations of this step refer to, or may be performed by, circuitry for determining and/or code for determining as described with reference to FIG. 9.

In some aspects, the measurement report includes: a first receive power associated with the at least one communication beam; and receive powers associated with two additional communication beams of the plurality of communication beams that are adjacent to the at least one communication beam.

In some aspects, the corrected spatial direction for the at least one communication beam comprises an adjusted spatial direction of the at least one communication beam that results in: the receive powers associated with the two additional communication beams that are adjacent to the at least one communication beam being approximately equal; and the receive powers associated with the two additional communication beams that are adjacent to the at least one communication beam being less than the first receive power associated with the at least one communication beam.

In some aspects, the method 800 further includes receiving, from the second apparatus, an indication of a LOS link direction of the second apparatus relative to the first apparatus. In some cases, the operations of this step refer to, or may be performed by, circuitry for receiving and/or code for receiving as described with reference to FIG. 9. In some aspects, adjusting the different spatial directions of the plurality of communication beams generated by the at least one lens beamformer is based on the indication of the LOS link direction of the second apparatus.

In some aspects, the plurality of communication beams comprise sub-THz communication beams.

In one aspect, method 800, or any aspect related to it, may be performed by an apparatus, such as communications device 900 of FIG. 9, which includes various components operable, configured, or adapted to perform the method 800. Communications device 900 is described below in further detail.

Note that FIG. 8 is just one example of a method, and other methods including fewer, additional, or alternative steps are possible consistent with this disclosure.

Example Communications Device

FIG. 9 depicts aspects of an example communications device 900. In some aspects, communications device 900 is a user equipment, such as UE 104 described above with respect to FIGS. 1 and 3. In some aspects, communications device 900 is a network entity, such as BS 102 of FIGS. 1 and 3, or a disaggregated base station as discussed with respect to FIG. 2.

The communications device 900 includes a processing system 905 coupled to the transceiver 975 (e.g., a transmitter and/or a receiver). In some aspects (e.g., when communications device 900 is a network entity), processing system 905 may be coupled to a network interface 985 that is configured to obtain and send signals for the communications device 900 via communication link(s), such as a backhaul link, midhaul link, and/or fronthaul link as described herein, such as with respect to FIG. 2. The transceiver 975 is configured to transmit and receive signals for the communications device 900 via the antenna 980, such as the various signals as described herein. In some cases, the antenna 980 may be an example of a lens beamformer as described herein, such as lens beamformer 606 illustrated in FIG. 6. Additionally, as illustrated, the communications device 900 includes a motor 990 coupled with the antenna 980 and configured to adjust a position of the antenna 980, as described above. The processing system 905 may be configured to perform processing functions for the communications device 900, including processing signals received and/or to be transmitted by the communications device 900.

The processing system 905 includes one or more processors 910. In various aspects, the one or more processors 910 may be representative of one or more of receive processor 358, transmit processor 364, TX MIMO processor 366, and/or controller/processor 380, as described with respect to FIG. 3. In various aspects, one or more processors 910 may be representative of one or more of receive processor 338, transmit processor 320, TX MIMO processor 330, and/or controller/processor 340, as described with respect to FIG. 3. As shown, the one or more processors 910 are coupled with the motor 990 and, in some embodiments, may be configured to cause the motor to adjust a position of the antenna 980 using techniques described above with respect to FIG. 6.

Additionally, as shown, the one or more processors 910 are coupled to a computer-readable medium/memory 940 via a bus 970. In certain aspects, the computer-readable medium/memory 940 is configured to store instructions (e.g., computer-executable code) that when executed by the one or more processors 910, cause the one or more processors 910 to perform the method 800 described with respect to FIG. 8, or any aspect related to it. Note that reference to a processor performing a function of communications device 900 may include one or more processors 910 performing that function of communications device 900.

In the depicted example, computer-readable medium/memory 940 stores code (e.g., executable instructions), such as code for communicating 945, code for adjusting 950, code for performing 955, code for receiving 960, and code for determining 965. Processing of the code for communicating 945, code for adjusting 950, code for performing 955, code for receiving 960, and code for determining 965 may cause the communications device 900 to perform the method 800 described with respect to FIG. 8, or any aspect related to it.

The one or more processors 910 include circuitry configured to implement (e.g., execute) the code stored in the computer-readable medium/memory 940, including circuitry for communicating 915, circuitry for adjusting 920, circuitry for performing 925, circuitry for receiving 930, and circuitry for determining 935. Processing with circuitry for communicating 915, circuitry for adjusting 920, circuitry for performing 925, circuitry for receiving 930, and circuitry for determining 935 may cause the communications device 900 to perform the method 800 described with respect to FIG. 8, or any aspect related to it.

Various components of the communications device 900 may provide means for performing the method 800 described with respect to FIG. 8, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 975 and the antenna 980 of the communications device 900 in FIG. 9. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 975 and the antenna 980 of the communications device 900 in FIG. 9.

Example Clauses

Implementation examples are described in the following numbered clauses:

Clause 1: A method for wireless communication by a first apparatus, comprising: communicating one or more transmissions with a second apparatus using a plurality of communication beams, generated by at least one lens beamformer of the first apparatus, having different spatial directions; and adjusting, using at least one motor of the first apparatus coupled with the at least one lens beamformer, the different spatial directions of the plurality of communication beams generated by the at least one lens beamformer.

Clause 2: The method of Clause 1, wherein adjusting the different spatial directions of the plurality of communication beams generated by the at least one lens beamformer comprises adjusting a position of the at least one lens beamformer.

Clause 3: The method of Clause 2, adjusting the position of the at least one lens beamformer is performed according to a granularity that is at least an order of magnitude less than an angular separation between two adjacent communication beams in the plurality of communication beams.

Clause 4: The method of any one of Clauses 1-3, further comprising: adjusting, using the at least one motor, a polarization of the plurality of communication beams generated by the at least one lens beamformer.

Clause 5: The method of Clause 4, wherein adjusting the polarization of the plurality of communication beams generated by the at least one lens beamformer comprises rotating the at least one lens beamformer.

Clause 6: The method of any one of Clauses 1-5, further comprising: performing a beam refinement procedure to determine a corrected spatial direction for at least one communication beam of the plurality of communication beams, wherein communicating the one or more transmissions with the second apparatus is based on the corrected spatial direction for the at least one communication beam.

Clause 7: The method of Clause 6, wherein performing the beam refinement procedure is based on a set of measurement opportunities for performing received power measurements associated with the one or more transmissions.

Clause 8: The method of Clause 6, wherein performing the beam refinement procedure is based on the one or more transmissions communicated with the second apparatus; and the one or more transmissions communicated with the second apparatus comprise at least one of SSBs or BM CSI-RSs.

Clause 9: The method of Clause 6, wherein performing the beam refinement procedure comprises adjusting a position of the at least one lens beamformer resulting in adjusted spatial directions for the plurality of communication beams.

Clause 10: The method of Clause 9, wherein performing the beam refinement procedure comprises performing receive power measurements for the one or more transmissions received from the second apparatus using the plurality of communication beams having the adjusted spatial directions.

Clause 11: The method of Clause 10, wherein performing the receive power measurements comprises: measuring a first receive power associated with the at least one communication beam; and measuring receive powers associated with two additional communication beams of the plurality of communication beams that are adjacent to the at least one communication beam.

Clause 12: The method of Clause 11, wherein the corrected spatial direction for the at least one communication beam comprises an adjusted spatial direction of the at least one communication beam that results in: the receive powers associated with the two additional communication beams that are adjacent to the at least one communication beam being approximately equal; and the receive powers associated with the two additional communication beams that are adjacent to the at least one communication beam being less than the first receive power associated with the at least one communication beam.

Clause 13: The method of Clause 9, wherein performing the beam refinement procedure comprises transmitting a request to the second apparatus, requesting the second apparatus to perform receive power measurements for the one or more transmissions transmitted to the second apparatus using the plurality of communication beams having the adjusted spatial directions.

Clause 14: The method of Clause 13, further comprising: receiving a measurement report from the second apparatus including the receive power measurements for the one or more transmissions transmitted to the second apparatus using the plurality of communication beams having the adjusted spatial directions.

Clause 15: The method of Clause 14, further comprising: determining the corrected spatial direction for at least one communication beam based on the measurement report received from the second apparatus.

Clause 16: The method of Clause 15, wherein the measurement report includes: a first receive power associated with the at least one communication beam; and receive powers associated with two additional communication beams of the plurality of communication beams that are adjacent to the at least one communication beam.

Clause 17: The method of Clause 16, wherein the corrected spatial direction for the at least one communication beam comprises an adjusted spatial direction of the at least one communication beam that results in: the receive powers associated with the two additional communication beams that are adjacent to the at least one communication beam being approximately equal; and the receive powers associated with the two additional communication beams that are adjacent to the at least one communication beam being less than the first receive power associated with the at least one communication beam.

Clause 18: The method of any one of Clauses 1-17, further comprising receiving, from the second apparatus, an indication of a LOS link direction of the second apparatus relative to the first apparatus, wherein adjusting the different spatial directions of the plurality of communication beams generated by the at least one lens beamformer is based on the indication of the LOS link direction of the second apparatus.

Clause 19: The method of any one of Clauses 1-18, wherein the plurality of communication beams comprise sub-THz communication beams.

Clause 20: An apparatus, comprising: a memory comprising executable instructions; and a processor configured to execute the executable instructions and cause the apparatus to perform a method in accordance with any one of Clauses 1-19.

Clause 21: An apparatus, comprising means for performing a method in accordance with any one of Clauses 1-19.

Clause 22: A non-transitory computer-readable medium comprising executable instructions that, when executed by a processor of an apparatus, cause the apparatus to perform a method in accordance with any one of Clauses 1-19.

Clause 23: A computer program product embodied on a computer-readable storage medium comprising code for performing a method in accordance with any one of Clauses 1-19.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first apparatus for wireless communication, comprising:
at least one lens beamformer configured to generate a plurality of communication beams having different spatial directions;
a transceiver configured to communicate one or more transmissions with a second apparatus using the plurality of communication beams generated by the at least one lens beamformer, the second apparatus being a terrestrial network element; and
at least one motor, coupled with at least one lens beamformer, configured to adjust the different spatial directions of the plurality of communication beams generated by the at least one lens beamformer; and
one or more processors configured to execute executable instructions stored on one or more memories to cause the first apparatus to perform a beam refinement procedure to determine a corrected spatial direction for at least one communication beam of the plurality of communication beams, wherein:
to perform the beam refinement procedure, the one or more processors are configured to cause the motor to adjust a position of the at least one lens beamformer resulting in adjusted spatial directions for the plurality of communication beams, including the corrected spatial direction for the at least one communication beam; and
the transceiver is further configured to communicate the one or more transmissions with the second apparatus based on the corrected spatial direction for the at least one communication beam.

2. The first apparatus of claim 1, wherein:
in order to adjust the different spatial directions of the plurality of communication beams generated by the at least one lens beamformer, the at least one motor is configured to adjust the position of the at least one lens beamformer; and
the motor is configured to adjust the position of the at least one lens beamformer according to a granularity that is at least an order of magnitude less than an angular separation between two adjacent communication beams in the plurality of communication beams.

3. The first apparatus of claim 1, wherein:
the at least one motor is further configured to adjust a polarization of the plurality of communication beams generated by the at least one lens beamformer; and
in order to adjust the polarization of the plurality of communication beams generated by the at least one lens beamformer, the motor is further configured to rotate the at least one lens beamformer.

4. The first apparatus of claim 1, wherein the one or more processors are configured to cause the first apparatus to perform the beam refinement procedure based on a set of measurement opportunities for performing received power measurements associated with the one or more transmissions.

5. The first apparatus of claim 1, wherein:
the one or more processors are configured to cause the first apparatus to perform the beam refinement procedure based on the one or more transmissions communicated with the second apparatus; and
the one or more transmissions communicated with the second apparatus comprise at least one of synchronization signal blocks (SSBs) or beam management channel state information reference signals (BM CSI-RSs).

6. The first apparatus of claim 1, wherein, in order to perform the beam refinement procedure, the one or more processors are configured is further configured to cause the first apparatus to perform receive power measurements for the one or more transmissions received from the second apparatus using the plurality of communication beams having the adjusted spatial directions.

7. The first apparatus of claim 6, wherein:
in order to perform the receive power measurements, the processor is further configured to:
measure a first receive power associated with the at least one communication beam; and
measure receive powers associated with two additional communication beams of the plurality of communication beams that are adjacent to the at least one communication beam; and
the corrected spatial direction for the at least one communication beam comprises an adjusted spatial direction of the at least one communication beam that results in:
the receive powers associated with the two additional communication beams that are adjacent to the at least one communication beam being approximately equal; and
the receive powers associated with the two additional communication beams that are adjacent to the at least one communication beam being less than the first receive power associated with the at least one communication beam.

8. The first apparatus of claim 1, wherein, in order to perform the beam refinement procedure, the one or more processors are configured to cause the first apparatus to output a request for transmission to the second apparatus via the transceiver, requesting the second apparatus to perform receive power measurements for the one or more transmissions transmitted to the second apparatus using the plurality of communication beams having the adjusted spatial directions.

9. The first apparatus of claim 8, wherein:
the transceiver is further configured to receive a measurement report from the second apparatus including the receive power measurements for the one or more transmissions transmitted to the second apparatus using the plurality of communication beams having the adjusted spatial directions; and
the processor is configured to determine the corrected spatial direction for at least one communication beam based on the measurement report received from the second apparatus.

10. The first apparatus of claim 9, wherein:
the measurement report includes:
 a first receive power associated with the at least one communication beam; and
 receive powers associated with two additional communication beams of the plurality of communication beams that are adjacent to the at least one communication beam; and
the corrected spatial direction for the at least one communication beam comprises an adjusted spatial direction of the at least one communication beam that results in:
 the receive powers associated with the two additional communication beams that are adjacent to the at least one communication beam being approximately equal; and
 the receive powers associated with the two additional communication beams that are adjacent to the at least one communication beam being less than the first receive power associated with the at least one communication beam.

11. The first apparatus of claim 1, wherein:
the transceiver is further configured to receive, from the second apparatus, an indication of a line of sight (LOS) link direction of the second apparatus relative to the first apparatus; and
the at least one motor is configured to adjust the different spatial directions of the plurality of communication beams generated by the at least one lens beamformer based on the indication of the LOS link direction of the second apparatus.

12. The first apparatus of claim 1, wherein the plurality of communication beams comprise sub-terahertz (sub-THz) communication beams.

13. A method for wireless communication by a first apparatus, comprising:
communicating one or more transmissions with a second apparatus using a plurality of communication beams, generated by at least one lens beamformer of the first apparatus, having different spatial directions, the second apparatus being a terrestrial network element;
adjusting, using at least one motor of the first apparatus coupled with the at least one lens beamformer, the different spatial directions of the plurality of communication beams generated by the at least one lens beamformer; and
performing a beam refinement procedure to determine a corrected spatial direction for at least one communication beam of the plurality of communication beams, wherein:
 performing the beam refinement procedure comprises adjusting a position of the at least one lens beamformer resulting in adjusted spatial directions for the plurality of communication beams; and
 communicating the one or more transmissions with the second apparatus is based on the corrected spatial direction for the at least one communication beam.

14. The method of claim 13, wherein adjusting the different spatial directions of the plurality of communication beams generated by the at least one lens beamformer comprises adjusting the position of the at least one lens beamformer according to a granularity that is at least an order of magnitude less than an angular separation between two adjacent communication beams in the plurality of communication beams.

15. The method of claim 13, further comprising adjusting, using the at least one motor, a polarization of the plurality of communication beams generated by the at least one lens beamformer, wherein adjusting the polarization of the plurality of communication beams generated by the at least one lens beamformer comprises rotating the at least one lens beamformer.

16. The method of claim 13, wherein performing the beam refinement procedure is based on a set of measurement opportunities for performing received power measurements associated with the one or more transmissions.

17. The method of claim 13, wherein:
performing the beam refinement procedure is based on the one or more transmissions communicated with the second apparatus; and
the one or more transmissions communicated with the second apparatus comprise at least one of synchronization signal blocks (SSBs) or beam management channel state information reference signals (BM CSI-RSs).

18. The method of claim 13, wherein performing the beam refinement procedure comprises performing receive power measurements for the one or more transmissions received from the second apparatus using the plurality of communication beams having the adjusted spatial directions.

19. The method of claim 18, wherein:
performing the receive power measurements comprises:
 measuring a first receive power associated with the at least one communication beam; and
 measuring receive powers associated with two additional communication beams of the plurality of communication beams that are adjacent to the at least one communication beam; and
the corrected spatial direction for the at least one communication beam comprises an adjusted spatial direction of the at least one communication beam that results in:
 the receive powers associated with the two additional communication beams that are adjacent to the at least one communication beam being approximately equal; and
 the receive powers associated with the two additional communication beams that are adjacent to the at least one communication beam being less than the first receive power associated with the at least one communication beam.

20. The method of claim 13, wherein performing the beam refinement procedure comprises transmitting a request to the second apparatus, requesting the second apparatus to perform receive power measurements for the one or more transmissions transmitted to the second apparatus using the plurality of communication beams having the adjusted spatial directions.

21. The method of claim 20, further comprising:
receiving a measurement report from the second apparatus including the receive power measurements for the one or more transmissions transmitted to the second apparatus using the plurality of communication beams having the adjusted spatial directions; and
determining the corrected spatial direction for at least one communication beam based on the measurement report received from the second apparatus.

22. The method of claim 21, wherein:
the measurement report includes:
 a first receive power associated with the at least one communication beam; and
 receive powers associated with two additional communication beams of the plurality of communication beams that are adjacent to the at least one communication beam; and the corrected spatial direction for the at least one communication beam comprises an adjusted spatial direction of the at least one communication beam that results in:

the receive powers associated with the two additional communication beams that are adjacent to the at least one communication beam being approximately equal; and the receive powers associated with the two additional communication beams that are adjacent to the at least one communication beam being less than the first receive power associated with the at least one communication beam.

23. The method of claim 13, further comprising:

receiving, from the second apparatus, an indication of a line of sight (LOS) link direction of the second apparatus relative to the first apparatus, wherein adjusting the different spatial directions of the plurality of communication beams generated by the at least one lens beamformer is based on the indication of the LOS link direction of the second apparatus.

24. The method of claim 13, wherein the plurality of communication beams comprise sub-terahertz (sub-THz) communication beams.

25. A first apparatus for wireless communication, comprising:

means for communicating one or more transmissions with a second apparatus using a plurality of communication beams, generated by at least one lens beamformer of the first apparatus, having different spatial directions, the second apparatus being a terrestrial network element; and means for adjusting, using at least one motor of the first apparatus coupled with the at least one lens beamformer, the different spatial directions of the plurality of communication beams generated by the at least one lens beamformer; and means for performing a beam refinement procedure to determine a corrected spatial direction for at least one communication beam of the plurality of communication beams, wherein:

the means for performing the beam refinement procedure comprises means for adjusting a position of the at least one lens beamformer resulting in adjusted spatial directions for the plurality of communication beams; and the means for communicating the one or more transmissions with the second apparatus comprise means for communicating the one or more transmissions based on the corrected spatial direction for the at least one communication beam.

26. A non-transitory computer-readable medium comprising executable instructions that, when executed by a processor of a first apparatus, cause the first apparatus to:

communicate one or more transmissions with a second apparatus using a plurality of communication beams, generated by at least one lens beamformer of the first apparatus, having different spatial directions, the second apparatus being a terrestrial network element; and adjust, using at least one motor of the first apparatus coupled with the at least one lens beamformer, the different spatial directions of the plurality of communication beams generated by the at least one lens beamformer; and perform a beam refinement procedure to determine a corrected spatial direction for at least one communication beam of the plurality of communication beams, wherein:

to perform the beam refinement procedure, the executable instructions cause the first apparatus to adjust a position of the at least one lens beamformer resulting in adjusted spatial directions for the plurality of communication beams; and the executable instructions cause the first apparatus to communicate the one or more transmissions with the second apparatus based on the corrected spatial direction for the at least one communication beam.

* * * * *